United States Patent
Sugimori

(10) Patent No.: US 7,417,671 B2
(45) Date of Patent: Aug. 26, 2008

(54) IMAGE PROCESSING SYSTEM CAPABLE OF PROVIDING COLOR CORRECTION

(75) Inventor: Masami Sugimori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 668 days.

(21) Appl. No.: 11/007,102

(22) Filed: Dec. 7, 2004

(65) Prior Publication Data
US 2005/0128316 A1 Jun. 16, 2005

(30) Foreign Application Priority Data
Dec. 12, 2003 (JP) ............................ 2003-414043

(51) Int. Cl.
*H04N 9/73* (2006.01)
*H04N 5/222* (2006.01)

(52) U.S. Cl. .............................. 348/223.1; 348/333.02; 348/333.12; 348/280; 348/273; 348/224.1

(58) Field of Classification Search ............. 348/222.1, 348/223.1, 220.1, 221.1, 224.1, 225.1, 228.1, 348/229.1, 230.1, 254, 255, 333.01, 333.02, 348/333.03, 333.04, 333.05, 333.11, 333.12, 348/207.99
See application file for complete search history.

(56) References Cited

U.S. PATENT DOCUMENTS

| | | | | |
|---|---|---|---|---|
| 5,343,311 A * | 8/1994 | Morag et al. | ................. | 358/518 |
| 6,512,540 B2 * | 1/2003 | Lathrop | ................... | 348/222.1 |
| 6,862,039 B2 * | 3/2005 | Shimizu | .................. | 348/223.1 |
| 6,947,080 B2 * | 9/2005 | Ikeda | ....................... | 348/223.1 |
| 7,075,569 B2 * | 7/2006 | Niikawa | ................... | 348/218.1 |
| 7,184,080 B2 * | 2/2007 | Kehtarnavaz et al. | .... | 348/223.1 |
| 7,212,234 B2 * | 5/2007 | Sakaguchi et al. | ....... | 348/223.1 |
| 7,280,136 B2 * | 10/2007 | Kuroiwa | ................ | 348/231.99 |
| 7,388,612 B2 * | 6/2008 | Fukui | ....................... | 348/33.12 |
| 2004/0095478 A1 * | 5/2004 | Takano et al. | ............. | 348/223.1 |
| 2005/0275732 A1 * | 12/2005 | Takeuchi | ................ | 348/231.99 |
| 2007/0140579 A1 * | 6/2007 | Miyashita | .................... | 382/254 |

FOREIGN PATENT DOCUMENTS

| | | | |
|---|---|---|---|
| JP | 2002-185972 A | | 6/2002 |
| JP | 2002185972 A | * | 6/2002 |
| JP | 2002185972 A | * | 6/2002 |

* cited by examiner

*Primary Examiner*—Ngoc-Yen Vu
*Assistant Examiner*—Peter Chon
(74) *Attorney, Agent, or Firm*—Canon U.S.A. Inc., I.P. Division

(57) ABSTRACT

An electrical signal output from an image sensing device is converted into digital image data and stored in a non-compressed form or a lossless-compressed form, in a storage medium. A user sets parameters associated with a white balance via a setting screen. The setting of the parameter is performed either in a first adjustment mode in which a color temperature is displayed as a parameter of the white balance is displayed together with the image data on the setting screen such that the user can adjust the color temperature or in a second adjustment mode in which a parameter of the white balance other than the color temperature is adjusted in a direction different from the direction in which the color temperature is adjusted. The image data is read from the storage medium and subjected to a white balance correction according to the parameters set via the setting screen.

11 Claims, 11 Drawing Sheets

(a)

(GREEN)

↕ DIRECTION PERPENDICULAR TO COLOR TEMPERATURE AXIS (PURPLE)

(BLUE) ←  COLOR TEMPERATURE  → (RED)

(b)

IMAGE PROCESSING SYSTEM CAPABLE OF PROVIDING COLOR CORRECTION

BACKGROUND OF THE INVENTION

1. Field of the Invention

The present invention relates generally to image processing systems and methods and more specifically to image processing systems and methods capable of providing color correction.

2. Description of the Related Art

Conventional color correction such as white balance correction for use in image capture devices is well known. White balance correction improves image quality by considering lighting type or sources for the environment in which a subject image is taken. The white balance of the image is adjusted along a color temperature (color range) for the light source such that a white image area in both the image and the subject are alike.

In a digital camera, the user can set white balance parameters to values different from preset values to obtain an accurate white balance for a specific image taken by the digital camera.

In the conventional technique, the white balance is evaluated and adjusted based on an image. This means that the white balance cannot be evaluated unless the image includes an area having a color close to white. Another problem with the conventional technique is that when the white balance adjustment is made such that an area that must be white is selected from the image and the white balance correction is made for the selected area, the result is often overcorrection for the image as a whole, and a natural color tone is lost.

If ratios among RGB components are varied arbitrarily, luminance can also be changed. White balance adjustment can be obtained for an image observed through the viewfinder before the image is captured. White balance adjustment can also be obtained for a rec-review image (a captured image displayed immediately after the image is taken). If, however, the image data has been stored (e.g., on a storage medium such as a memory card), the user is unable to provide white balance adjustment for the image data.

SUMMARY OF THE INVENTION

In view of the above, the present invention is directed to an image processing system and method that resolves one or more of the aforementioned disadvantages of conventional systems. An advantage of the present invention is that parameters associated with white balance can be set any time after an image is taken and stored. As another advantage, white balance can be adjusted by adjusting color temperature or by adjusting relative color component intensity to obtain an effect similar to that obtained by attaching a color temperature conversion filter or a camera lens without being restricted by a subject's colors and without affecting exposure.

In an aspect, the present invention provides an image capture device comprising an image sensing device which converts an optical image into an electric signal, an analog-to-digital converter which converts the electric signal output from the image sensing device into digital image data, a storage unit which stores the image data, in a non-compressed form or a lossless-compressed form, into a storage medium, a display which displays the image data, a setting unit which allows a user to set parameters of a white balance on a setting screen in a mode selected from a first adjustment mode in which a color temperature is displayed as a parameter of the white balance is displayed together with the image data on the display such that the user can adjust the color temperature and a second adjustment mode in which a parameter of the white balance other than the color temperature is adjusted in a direction different from the direction in which the color temperature is adjusted, and a white balance correction unit which makes a white balance correction on the image data read from the storage unit in accordance with the parameters set via the setting unit.

In another aspect, the present invention provides a method of capturing an image, comprising the steps of capturing an image by converting an optical image into an electrical signal, converting the electrical signal into digital image data, storing the image data, in a non-compressed form or a lossless-compressed form, into a storage medium, displaying the image data stored in the storage step, making a setting, in accordance with a user's setting operation performed via a setting screen, as to parameters of a white balance in a mode selected from a first adjustment mode in which a color temperature is displayed as a parameter of the white balance is displayed together with the image data on a setting screen such that the user can adjust the color temperature and a second adjustment mode in which a parameter of the white balance other than the color temperature is adjusted in a direction different from the direction in which the color temperature is adjusted, and making a white balance correction on the image data read from the storage unit in accordance with the parameters set in the setting step.

In another aspect, the present invention provides a computer-readable storage medium on which a program for implementing the method of capturing an image is stored.

In another aspect, the present invention provides a computer program for implementing the method of capturing an image.

In another aspect, the present invention provides an image processing apparatus for processing image data taken by an image capture device including an image sensing device for converting an optical image into an electric signal, an analog-to-digital converter for converting the electric signal output from the image sensing device into digital image data, and a storage unit for storing the image data, in a non-compressed form or a lossless-compressed form, into a storage medium, the image processing apparatus comprising an input unit for inputting image data stored in the storage medium, a display for displaying the image data input via the input unit, a setting unit for allowing a user to set parameters of a white balance on a setting screen in a mode selected from a first adjustment mode in which a color temperature is displayed as a parameter of the white balance is displayed together with the image data on the display such that the user can adjust the color temperature and a second adjustment mode in which a parameter of the white balance other than the color temperature is adjusted in a direction different from the direction in which the color temperature is adjusted, and a white balance correction unit for making a white balance correction on the image data read from the storage unit in accordance with the parameters set via the setting unit.

In another aspect, the present invention provides a method of processing image data taken by an image capture apparatus including an image sensing device which converts an optical image into an electric signal, an analog-to-digital converter which converts the electric signal output from the image sensing device into digital image data, and a storage unit which stores the image data, in a non-compressed form or a lossless-compressed form, into a storage medium, the method comprising the steps of inputting image data stored in the storage medium, displaying the image data input in the input step, making a setting, in accordance with a user's setting operation performed via a setting screen, as to parameters of a white balance in a mode selected from a first adjustment mode in which a color temperature is displayed as a parameter of the white balance is displayed together with the image data on a setting screen such that the user can adjust the color temperature and a second adjustment mode in which a parameter of the white balance other than the color temperature is adjusted in a direction different from the direction in which the color temperature is adjusted, and making a white balance correction on the image data read from the storage unit in accordance with the parameters set in the setting step.

The present invention has the advantage that a user can easily recognize the current state of the white balance and can easily change the parameters associated with the white balance in the two-dimensional color space. This allows the user to adjust the white balance of an image being taken by the camera in accordance with the preference of the user.

After an image is taken by the camera, the parameters of the white balance can be modified, and the white balance of the image can be corrected in accordance with the modified parameters, and a new image (e.g., JPEG) can be produced.

Further features and advantages of the present invention will become apparent from the following description of the embodiments with reference to the attached drawings.

The accompanying drawings, which are incorporated in and constitute a part of the specification, illustrate embodiments of the invention and, together with the description, serve to explain the principles of the invention.

DETAILED DESCRIPTION OF THE EMBODIMENTS

The present invention is described in detail below in accordance with embodiments and the accompanying drawings.

First Embodiment

A first embodiment of the present invention is described below with reference to FIGS. 1 to 11.

Figure 1:
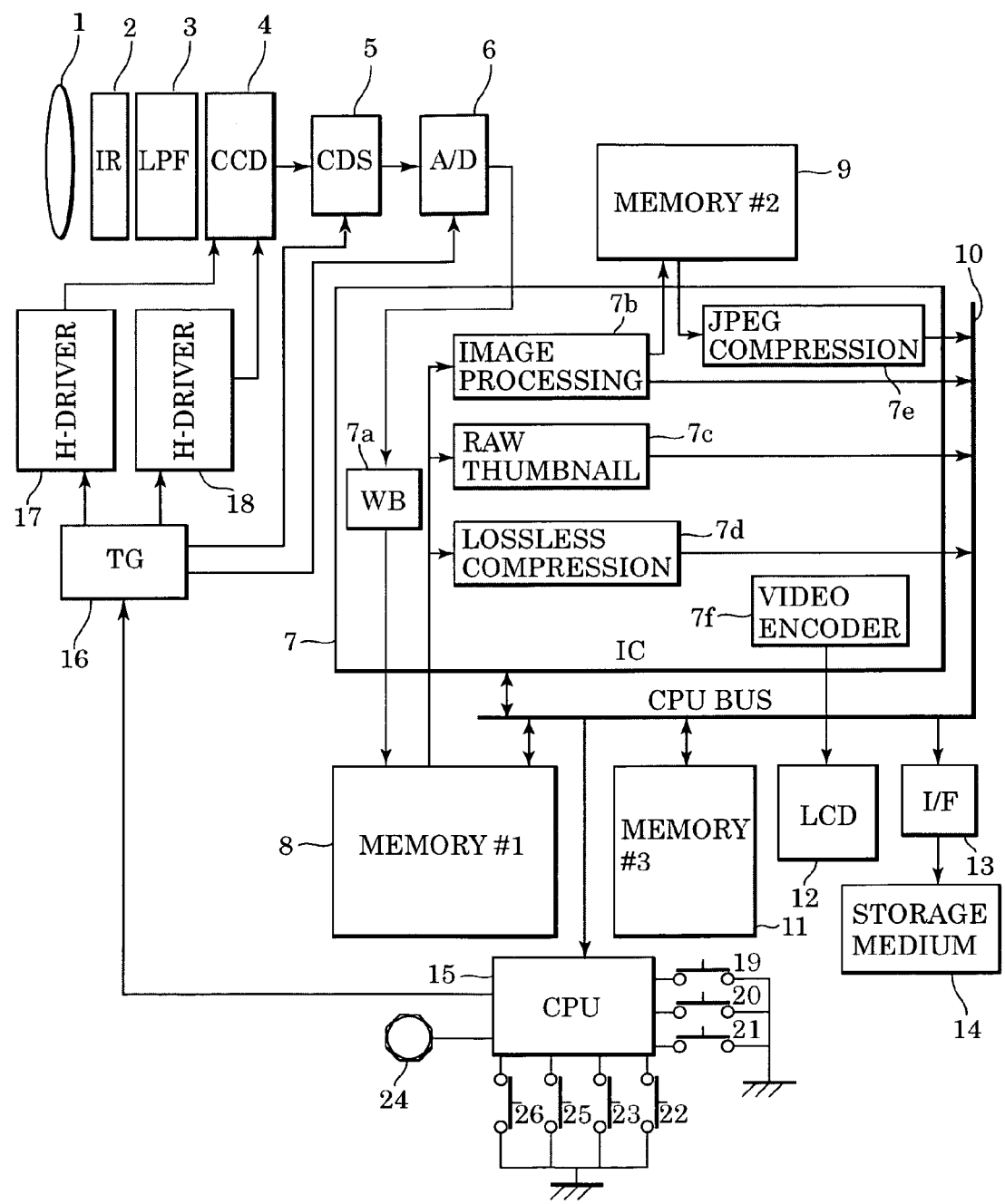
FIG. 1 is a block diagram of a digital camera according to an embodiment of the present invention.

FIG. 1 is a block diagram showing a digital camera according to the first embodiment of the present invention. The digital camera includes an imaging lens 1, an infrared rejection filter 2, an optical LPF 3, and an image sensor (CCD) 4. An image is captured when light passes via the imaging lens 1, the infrared rejection filter 2, and the optical LPF 3, and is then focused on the CCD 4.

The CCD 4 is composed of an array of photodiode sensor elements that receive light to capture a subject image. Each sensor element is covered with a R (red), G (green) or B (blue) color filter. The color filters may be arranged in a predetermined pattern so that the three image sensors are each assigned R, G and B. Alternatively, the filters may be arranged such that a single image sensor has layers, each of which is sensitive to one of the RGB colors.

The CCD 4 then converts the received light into electric charges, which vary depending on the intensity of the incident light. A signal generated by a timing generator 16 is supplied to both a horizontal driver 17 and a vertical driver 18 to sequentially convert the electric charges to a voltage signal. The resultant voltage signal is then sampled by a correlated double sampling (CDS) unit 5 and converted by an analog-to-digital converter 6 to digital image data.

The digital image data is then input to an IC 7 that includes a WB (white balancing) circuit 7a for calculating data needed for white balance correction. The digital image data applied to the WB circuit 7a is temporarily stored in a memory 8 serving as a work memory. This stored image data is again applied to the IC 7 for image processing.

In the present embodiment, the image processing includes the following processes.

The digital image data is compressed by a lossless compression circuit 7d, after which the data is output to CPU bus 10 as original raw image data.

Figure 10:
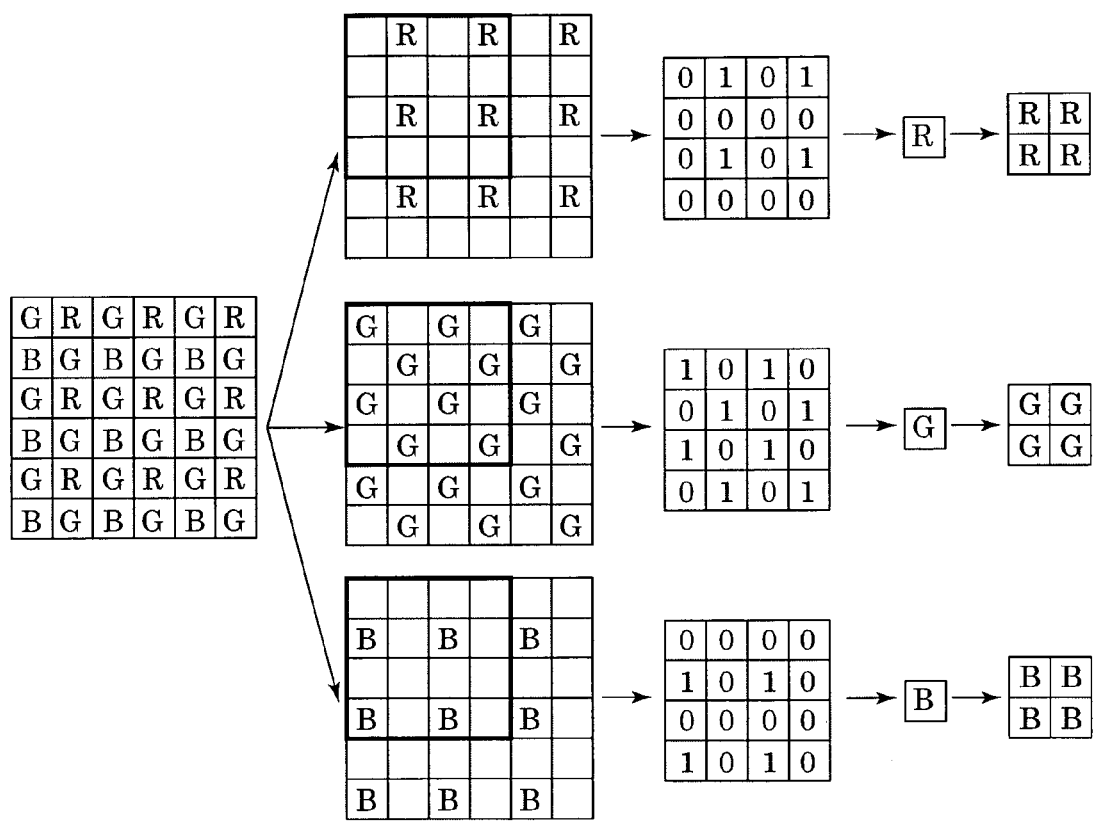
FIG. 10 is a conceptual diagram showing a method of data decimation in image processing performed by a digital camera according to an embodiment of the present invention.

The digital image data is also processed by the raw thumbnail circuit 7c, which averages the data block by block, wherein each block includes 5×5 pixels as shown in FIG. 10, to produce down-sampled image data. Thus, a thumbnail image with a size smaller than the original image is obtained. The resultant image data is output as raw thumbnail image data over the CPU bus 10. Thus, by reducing the number of pixels, false colors and moiré patterns can be prevented. And, by using raw thumbnail image, data loss and image quality degradation is reduced relative to use of JPEG-compressed image data. The raw thumbnail image data has a smaller data size and can be processed relatively faster than the original raw image data. Thus, the result of the image processing can be quickly displayed and a user can quickly determine the effect of previously set parameters.

The digital image data from the image sensor with the color filters for each pixel has only the R, G or B component. The missing components are obtained by interpolation performed by image processing circuit 7b. Thereafter, depending on the size of the LCD 12, data decimation is performed on the image data. The resultant image data is output as thumbnail image data for display on the LCD 12 (hereinafter, referred to simply as an LCD thumbnail image data).

To produce JPEG-compressed image data, the YCbCr image data output from the image processing circuit 7b is converted into raster blocks and stored in a second memory (#2) 9. The image data is then compressed by a JPEG compression circuit 7e, and the resultant JPEG image data is output over the CPU bus 10. This JPEG image data represents an image developed from the original raw image data according to conditions specified when the image was taken by the digital camera.

Figure 2:
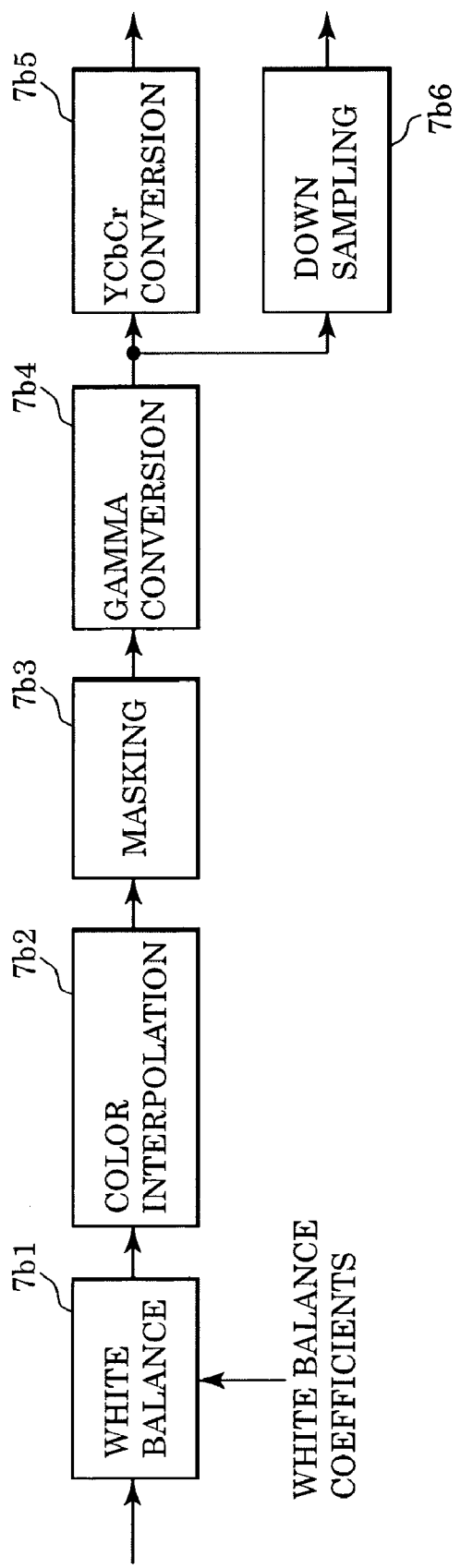
FIG. 2 is a diagram showing the details of an image processing block in the digital camera shown in FIG. 1.
Figure 3:
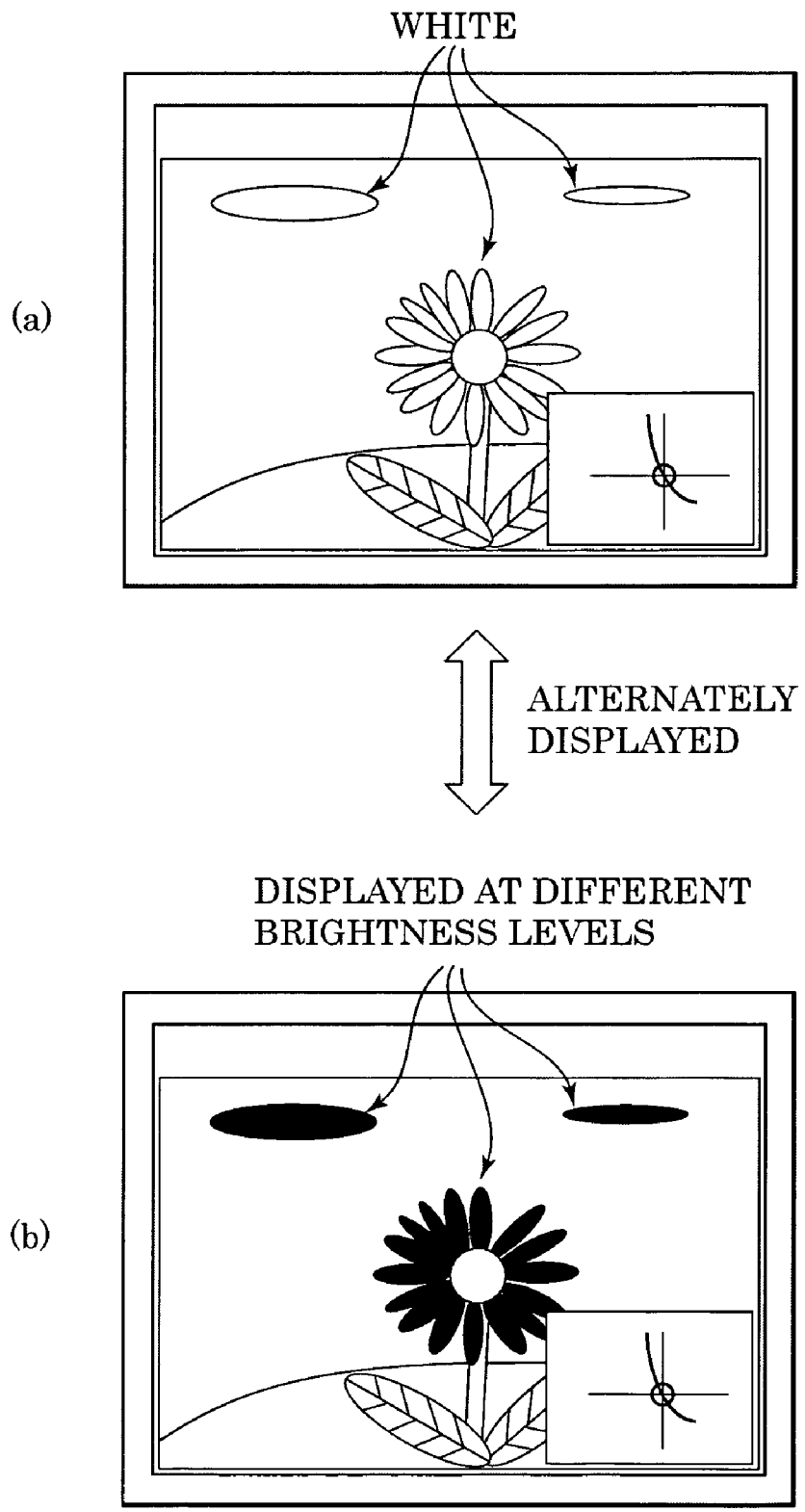
FIG. 3 is a diagram showing a manner in which an image for white balance adjustment is displayed on a GUI according to an embodiment of the present invention.
Figure 4:
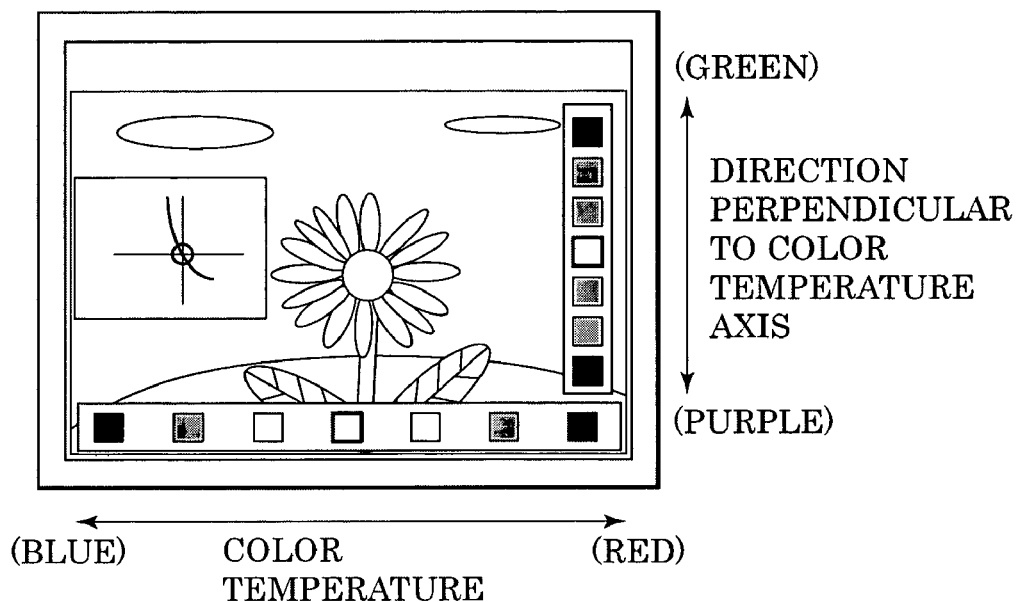
FIG. 4 is a diagram showing a manner in which the white balance is adjusted via the GUI according to an embodiment of the present invention.
Figure 4:
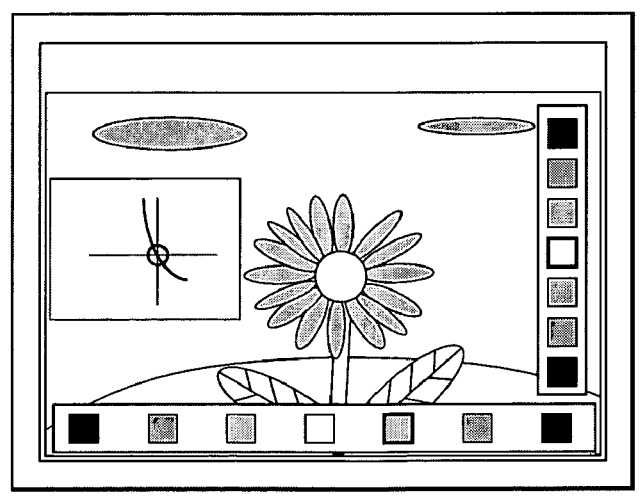

FIG. 2 illustrates image processing performed by the image processing circuit 7b in accordance with an embodiment of the present invention.

The image processing circuit 7b includes a white balance correction circuit 7b1, wherein the image data is read from the memory #1 (8) and is multiplied by white balance coefficients calculated by a CPU 15 based on the data calculated by the WB circuit 7a. Alternatively, the digital image data may be multiplied by predetermined white balance coefficients (depending on whether is light is daylight, tungsten light, or fluorescent light).

Figure 8:
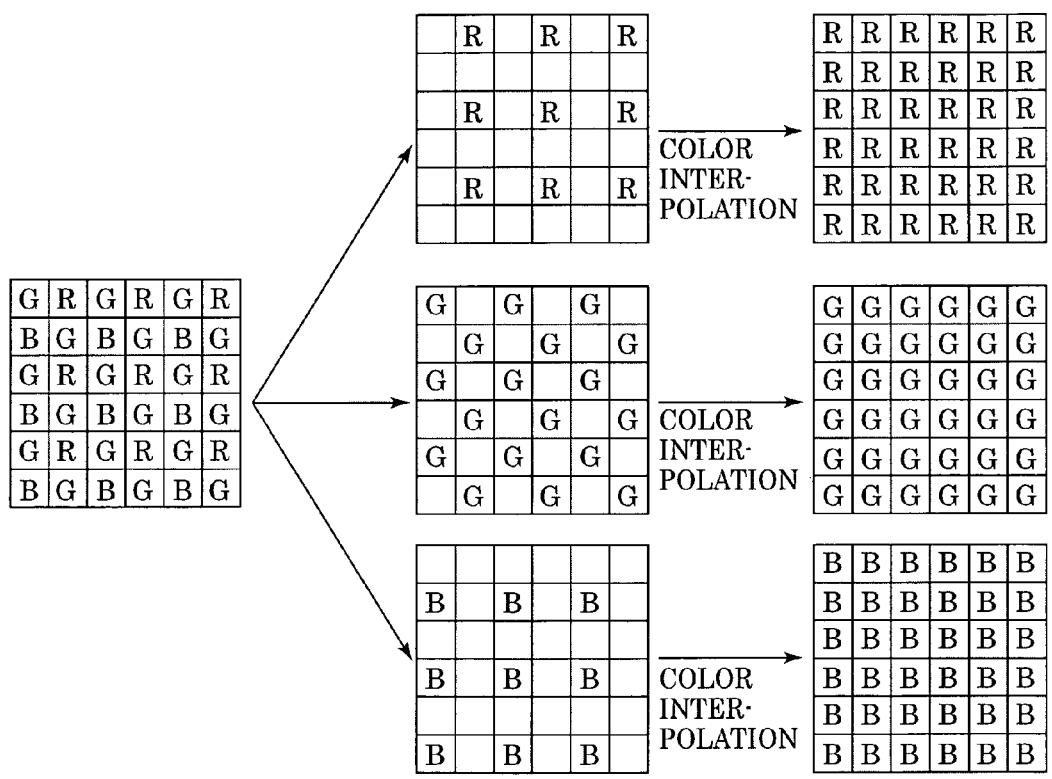
FIG. 8 is a conceptual diagram showing a method of interpolation in image processing performed by a digital camera according to an embodiment of the present invention.

After the white balance correction, the image data is then subjected to color interpolation in a color interpolation block 7b2. In the color interpolation, as shown in FIG. 8, R, G, and B image data in separate RGB three planes are produced from the original image data in which R, G, and B components are located side by side.

The image data in the three RGB planes are applied to a masking circuit 7b3 and multiplied by a 3×3 matrix given by equation 1, below, to optimize the color tone of the image.

$$R'=m_{11}\times R+m_{12}\times G+m_{13}\times B$$

$$G'=m_{21}\times R+m_{22}\times G+m_{23}\times B$$

$$B'=m_{31}\times R+m_{32}\times G+m_{33}\times B \quad (1)$$

The image data is then subjected to gamma conversion in a gamma conversion circuit 7b4. After gamma conversion, the image data is compressed by converting the RGB signal into a YCbCr signal including luminance and color difference components.

Figure 9:
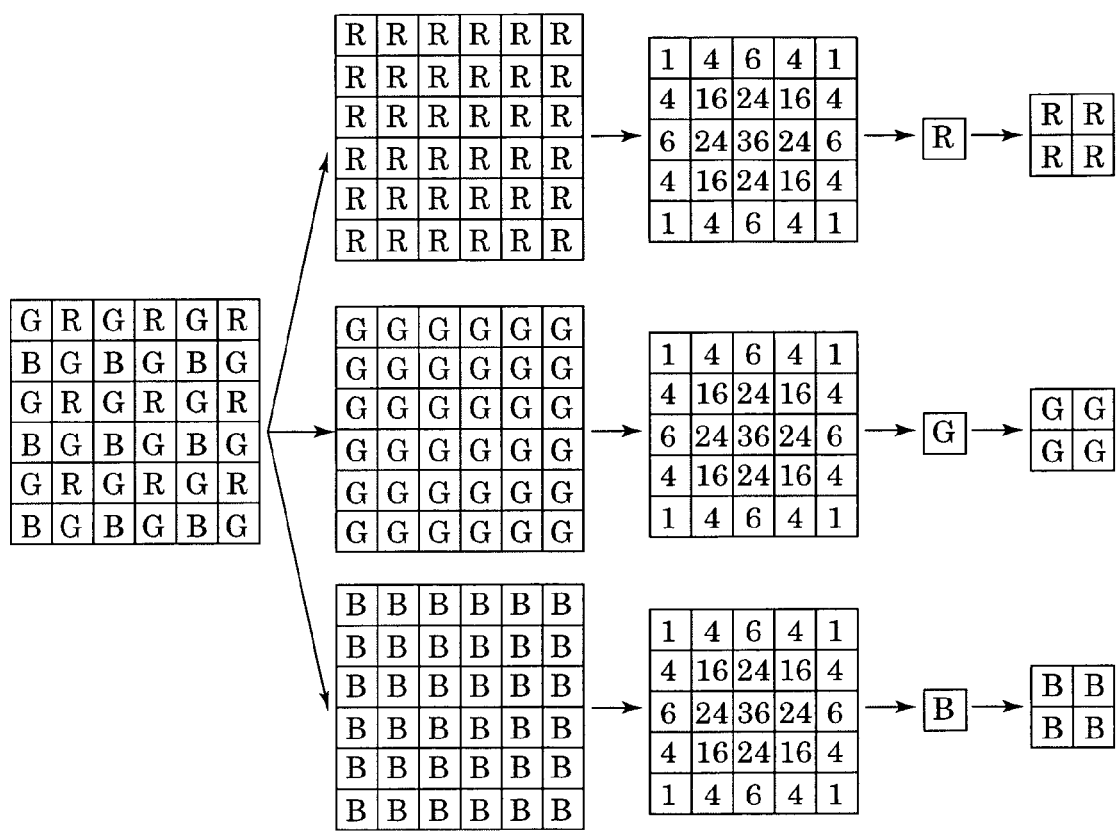
FIG. 9 shows a method of data decimation in image processing performed by a digital camera according to an embodiment of the present invention.

After gamma conversion, an LCD thumbnail image is produced. More specifically, as shown in FIG. 9, the image data in the three RGB planes is passed through a two-dimensional LPF (for example, 5×5 two-dimensional LPF shown in FIG. 9), and the data output from the two-dimensional LPF is subjected to data decimation to obtain an LCD thumbnail image.

When the lossless original raw image data is recorded, the following types of data are supplied to a buffer memory 11 (memory #3) via the CPU bus 10: (1) the lossless-compressed original raw image data; (2) the raw thumbnail data; (3) the thumbnail data for display on the LCD; and (4) the JPEG data. These four types of data are then combined into a single image file and stored in a storage medium 14 together with header information, and conditions under which the image was taken and properties of the digital camera. When the recording mode is not in the mode in which the original raw image data is recorded, only the LCD thumbnail data and the JPEG data are recorded.

The thumbnail data for use to display on the LCD is supplied to a video encoder 7f in the IC7 via the CPU bus 10. The encoded image data output from the video encoder 7f is supplied to an LCD 12 and displayed thereon.

The lossless-compressed data and the JPEG data is supplied to the storage medium 14 via an interface circuit 13 and stored in the storage medium 14.

Figure 12:
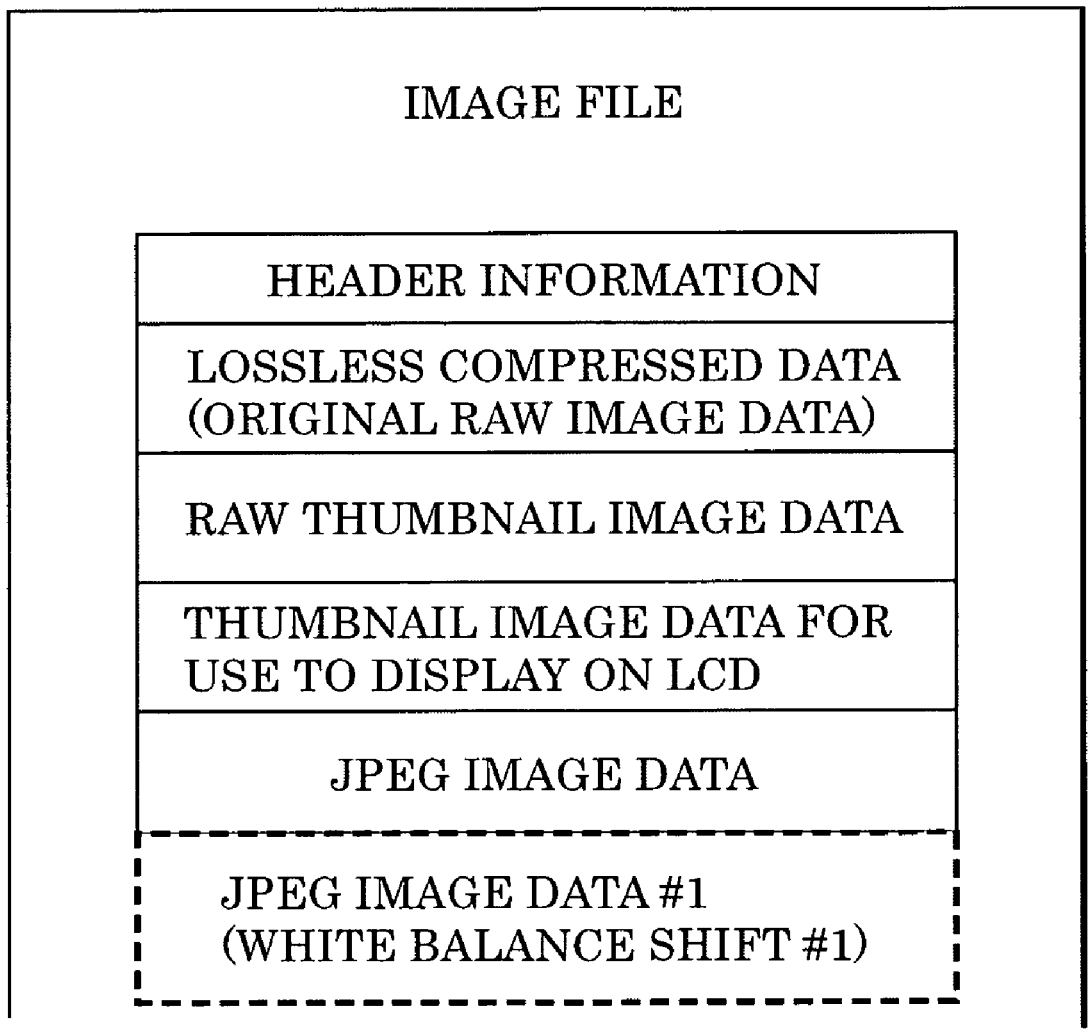
FIG. 12 is a diagram showing an example of a format of a file in which image data taken by a digital camera is stored according to an embodiment of the present invention.

The processing sequence described above is performed each time a release switch 19 connected to the CPU 15 is pressed, and produced image data is stored in the form of an image file as shown in FIG. 12.

A method of adjusting the white balance of an image according to an embodiment of the present invention is now described below.

When a white balance check switch 20 is pressed, the LCD thumbnail data is read from the storage medium 14 and displayed on the LCD. The display is such that the normal image of FIG. 3A and the image of FIG. 3B have areas specified to be white by a user (or by the system), and the specified areas are highlighted by changing the brightness thereof. Although in the present embodiment, the area specified as an area that must be white is highlighted by changing the brightness thereof, highlighting may be performed in other ways. For example, the area may be meshed or changed in color.

In FIG. 3A, on the LCD, a window showing a sub-color space for YCrCb having a Cb axis and a Cr axis is displayed. This color space is further illustrated in FIG. 5.

A Planckian locus (blackbody radiation locus) is plotted in the CbCr color space. A circuit 31 indicates a white color in the CbCr color space, which is obtained when an image is taken under daylight with a color temperature of 5000 K.

That is, the intersection of the Cb axis and the Cr axis corresponds to an achromatic color, and the white color under daylight is located at this intersection.

The area in a circle located at the intersection of the Cb axis and the Cr axis indicates an area regarded as a white area in the white balance correction.

That is, the current white area set by white balance adjustment is displayed in the two-dimensional color space such that the state of the white balance can be evaluated using a graphical representation.

In the image shown in FIG. 3B, an area corresponding to the circle 31 (FIG. 5) is changed in brightness, and the image shown in FIG. 3A and the image shown in FIG. 3B are alternately displayed at predetermined intervals of time such that a user can easily and visually recognize which area of the image taken by the digital camera is regarded as the white area in the white balance adjustment and such that the user can also recognize the size of that area. Note that the white balance coefficients table may be prepared for each color temperature.

The white balance adjustment may have a mode that maintains the gain of the G component. In this mode, the white balance is adjusted by changing intensities of the R and B components while the intensity of the G component is maintained. Of all the color components, the G component has the greatest contribution to luminance. Therefore, if the intensity of the G component is fixed during white balance adjustment, the color balance can be adjusted while maintaining the luminance at substantially the same level.

Figure 6:
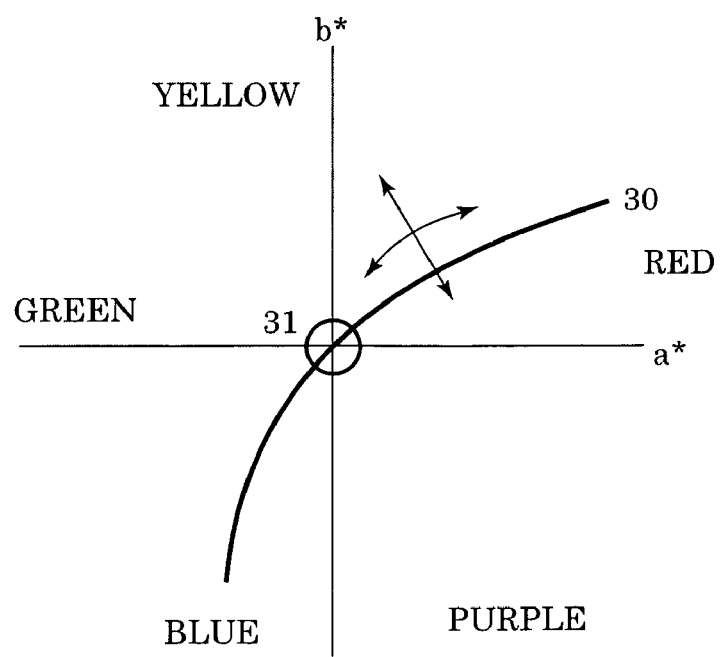
FIG. 6 is a diagram showing a white balance state displayed in a second display mode on the GUI according to an embodiment of the present invention.

In the present example, the two-dimensional space defined by the Cb axis and the Cr axis is used as the color space for use in the white balance adjustment. Alternatively, as shown in FIG. 6, the two-dimensional space may be defined by the a* axis and the b* axis of the La*b* space. A Planckian locus (blackbody radiation locus) 30 may also be plotted in an xy chromaticity diagram as shown in FIG. 7.

Figure 5:
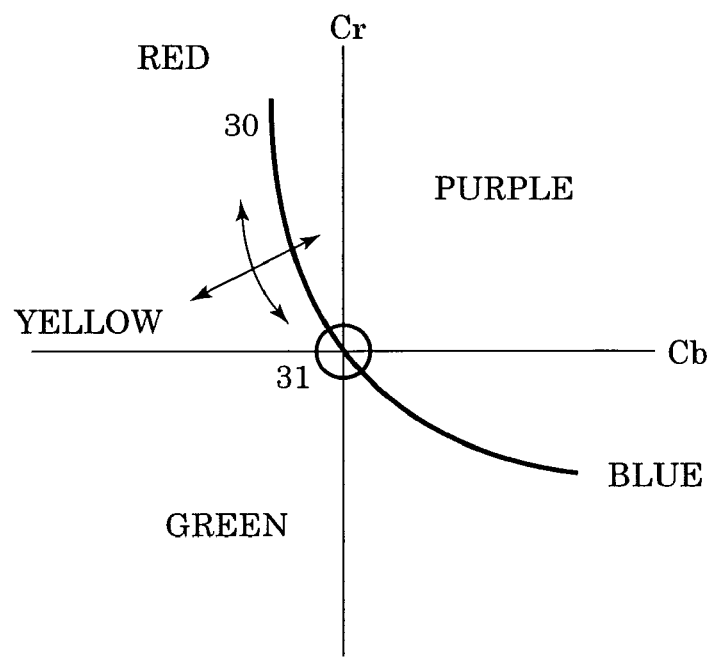
FIG. 5 is a diagram showing a white balance state displayed in a first display mode on the GUI according to an embodiment of the present invention.
Figure 7:
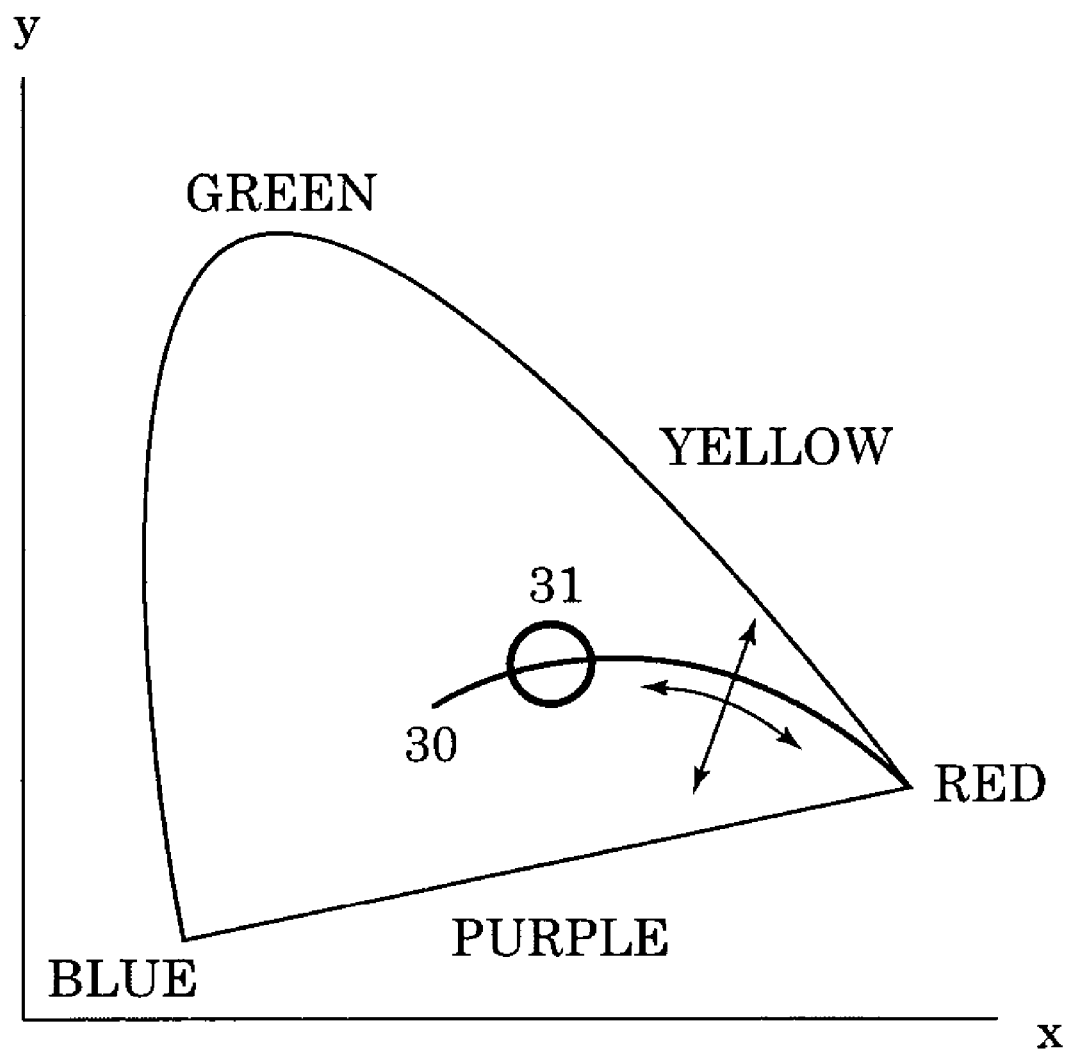
FIG. 7 is a diagram showing a white balance state displayed in a third display mode on the GUI according to an embodiment of the present invention.

To represent coordinates of the color space in color on a display, the two-dimensional color space of FIGS. 5, 6, and 7 is painted in colors such that each color is laid at coordinates corresponding to the color. In this manner, the user can easily and intuitively determine the direction to shift the white balance.

In this situation, if a white balance shift button 21 is pressed, in addition to the small window indicating the Cb-Cr plane, a white balance adjustment bar for shifting the white balance along a color temperature axis (in a direction from red to blue) and a white balance adjustment bar for shifting the white balance in a direction (from green to purple) perpendicular to the color temperature axis are displayed on the LCD, as shown in FIG. 4A.

In this state, if a dial 24 is turned while pressing a horizontal button 22, the white balance is shifted along the color temperature axis.

In response to the white balance shift, the circle 31 is also shifted from the intersection of the Cb axis and the Cr axis. This provides ease of use by allowing the user to visually determine the direction to shift and correctly adjust the white balance in the two-dimensional color space. The Planckian locus (blackbody radiation locus) plotted in the two-dimensional color space with varying temperature allows the user to visually determine the amount of shift from the default setting that is needed for a cloudy day or for clear daylight.

Each time the white balance is shifted, the thumbnail image displayed on the LCD is updated in real time to reflect the shift.

If a raw thumbnail data of an image is specified to be used, the raw thumbnail data is multiplied by white balance coefficients different from those used when the image was taken by the digital camera, and the result is displayed on the LCD.

Similarly, if the dial 24 is turned while pressing a vertical button 23, the white balance is shifted in a direction perpendicular to the color temperature direction, and the thumbnail image displayed on the LCD is updated such that the shifted white balance is reflected.

Also in this case, the luminance can be maintained at the same level by varying the gains for read (R) and blue (B) while maintaining the gain for green (G) at a fixed level so as to vary the ratio between green (G) and purple (R and B).

The GUI (graphic user interface) of the present embodiment allows the user to easily determine which direction to adjust the white balance without changing luminance.

After the white balance is adjusted, if a setting button 25 is pressed, the amount of shift of the white balance is stored in memory such that the white balance can be shifted for other images by the same amount as the stored value.

After the amount of the white balance shift is set, and an OK button 26 is pressed, recorrection of the white balance is made for the image stored in the storage medium 14 if both lossless-compressed image data and JPEG image data for that image are stored in the storage medium 14. In this case, the white balance is shifted by the value stored in memory for the lossless-compressed image data, and a JPEG image is produced with the shifted white balance. The resultant JPEG image data is stored in the storage medium 14. The parameters associated with the white balance used in the recorrection of the white balance are added to the header, and the new JPEG image data is added as JPEG image data #1 (white balance shift #1) to the image file as shown in FIG. 12. Alternatively, the new JPEG image data may be overwritten on the original JPEG image data produced when the image was taken. In this case, if the parameters associated with the white balance used for the original JPEG image data are retained in the header, the original JPEG image can be produced.

This process according to the present embodiment is described in further detail below with reference to the flow chart of FIG. 11.

First, in step S1, the process waits for the release switch of the digital camera to be turned on. When the release switch is turned on, exposure of an optical image to the image sensor is performed, and an image signal is accumulated in the image sensor.

The accumulated signal is read from the imaging device and converted into digital image data. The resultant digital image data is supplied to the IC 7 (step S3).

An area that must be white is detected from the digital image data, and the average value of the detected area is calculated to determine the white balance coefficients suitable for the image (step S4). The data for use in the white balance adjustment is stored in the memory #1 8 (step S5).

The white balance coefficients calculated in step S4 or predetermined white balance coefficients are set in the white balance block of in the IC 7 (step S6), and the image data stored in the memory #1 8 is read and input to the IC 7 (step S7).

The image data input to the IC 7 is converted into lossless-compressed original raw image data, raw thumbnail data, JPEG data, and LCD thumbnail data via the image processing described earlier, and the resultant image data is stored in the memory #3 11 (step S8).

Although in the present embodiment, a raw image signal output from the imaging device is recorded in the form of lossless-compressed image data, the raw image signal may be recorded in a non-compressed form. The raw image data may also be recorded at various stages of the image processing. For example, the image data may be recorded when color interpolation is performed, that is, after the image signal is converted into a digital signal. The image data may also be recorded when white balance adjustment is yet to be performed or when the image signal output from the imaging device is converted into a digital signal prior to separation of the signal into a luminance signal and color signals. Nevertheless, the raw image data is preferably recorded when significant degradation or significant information loss has not yet occurred.

Of the produced image data in the previously discussed four data forms, the LCD thumbnail image is read and input to the IC 7, and displayed on the LCD (step S9).

The image data in the four forms, including lossless-compressed image data in the TIFF format and image data in the JPEG format, stored in the memory #3 (11) are stored together with additional header data are combined into a single image file (step S10) and stored in a storage medium (step S11).

A determination is then made as to whether the white balance check switch 20 is pressed to check the white balance of the LCD thumbnail image currently displayed on the LCD (step S13). If the white balance check switch 20 is pressed, the RGB data of the LCD thumbnail image is converted into YCbCr data and displayed on the LCD such that a specified white area in the current setting is periodically switched between an original brightness display to a gray level (within the range from white to black) display (step S14). A two-dimensional color space in which a curve of a blackbody ration locus is plotted along a color temperature is displayed together with the image such that a user can recognize the current setting of the white balance or the preset white balance.

Even when the image displayed on the LCD does not include a white area, the indication in the two-dimensional color space allows the user to recognize the current setting of the white balance relative to the color temperature curve.

If the user specifies a new white area (other than the current white area) (step S15), the process returns to step S14, in which the specified area is set as the new white area, which is then periodically switched between a display of the area at the original brightness and a display in which the brightness is changed from the original brightness as described above. In the present embodiment, as described above, the image is displayed such that the white area blinks (flashes) by periodically switching the brightness thereof, and thus the user can easily adjust the white balance in the correct direction, and the result of the white adjustment is immediately reflected in the displayed image.

When the image does not include a white area, the user can adjust the white balance by shifting the circle 31 (FIG. 5) indicating the white area in the two-dimensional color space on the color temperature curve. In the present embodiment, a proper white balance can be easily achieved.

If the white balance check switch 20 is pressed again (step S16), the white balance is fixed, the blinking of the white area is stopped, and the image with the adjusted white balance is displayed in a normal manner (step S17).

If the release switch 19 is pressed (step S18), the LCD is turned off and the processing sequence of taking an image is started.

After the white area is determined, if the white balance shift button is pressed (step S19) without pressing the white balance check button (step in S13), the white balance shift GUI is displayed (step S21). If neither the white balance check button (S13) nor the white balance shift button (step S19) is pressed, the process waits for a release signal to be received while displaying the LCD image (step S20).

If the white balance is shifted along the color temperature axis (by turning the white balance shift dial while pressing the horizontal button 22) or if the white balance is shifted in a direction perpendicular to the color temperate axis (by turning the white balance shift dial while pressing the vertical button 23) (step S22), the amount of the shift of the white balance corresponding to the amount of rotation of the dial is calculated, and the white balance coefficients are recalculated (step S24).

The raw thumbnail image data is multiplied by the calculated white balance coefficients, the image processing is performed again (redevelopment is perform), and the resultant image is displayed on the LCD (step S25).

If, thereafter, the user presses a white balance setting button 25 (step S26), the white balance coefficients determined from the shift of the white balance are set in the white balance block of the IC 7 (step S27).

If the user presses a white balance OK button 26 (step S28), the white balance coefficients are fixed. The lossless-compressed raw image data stored in the storage medium is decompressed and stored in the memory #1 8. The image data stored in the memory #1 8 is multiplied by the white balance coefficients determined in the above-described manner thereby performing redevelopment. From the resultant image data, a JPEG image file is finally produced and stored in the storage medium 14 (step S29).

In this state, if the white balance shift button is pressed again (step S30), the white balance shift GUI is deleted (step S31) while maintaining the redisplayed thumbnail image, and the process waits for the release signal to be generated.

By repeatedly performing the above-described process, the user can modify the values of the parameters associated with the white balance from the default values preset in the digital camera to desired values. If the parameters associated with white balance are modified, the image displayed on the LCD is immediately updated according to the new parameters, and the user can view the updated image in which the modification of the parameters is reflected. This allows the user to easily modify the image according to the user's preferences.

In the present embodiment, as described above, each time an image is taken by an image capture device such as a digital camera in the raw image recording mode, image data is produced. Four types of image data are contemplated although additional types within the spirit and scope of the present invention can be found. The four forms, that is, lossless-compressed original raw image data, raw thumbnail data, LCD thumbnail data, and JPEG data are produced, and these image data are stored in a single file together with header information indicating the file name, the conditions under which the image is taken, and properties of the digital camera. Alternatively, the image data in the four forms may be stored in a file, and the header information may be stored separately in another file such that these two files are linked to each other.

Other Embodiment

The object of the present invention can also be achieved by providing a storage medium storing program codes for performing the aforesaid processes to an image sensing system, reading the program codes, by a CPU or MPU of the image sensing system, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN(local area network) and WAN(wide area network), can be used for providing the program codes.

Furthermore, besides aforesaid functions according to the above embodiments are realized by executing the program codes which are read by a CPU of the image sensing system, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or in a memory provided in a function expansion unit which is connected to the image sensing system, CPU or the like contained in the function expansion card or unit performs a part or entire process in accordance with designations of the program codes and realizes functions of the above embodiments.

Figure 11:
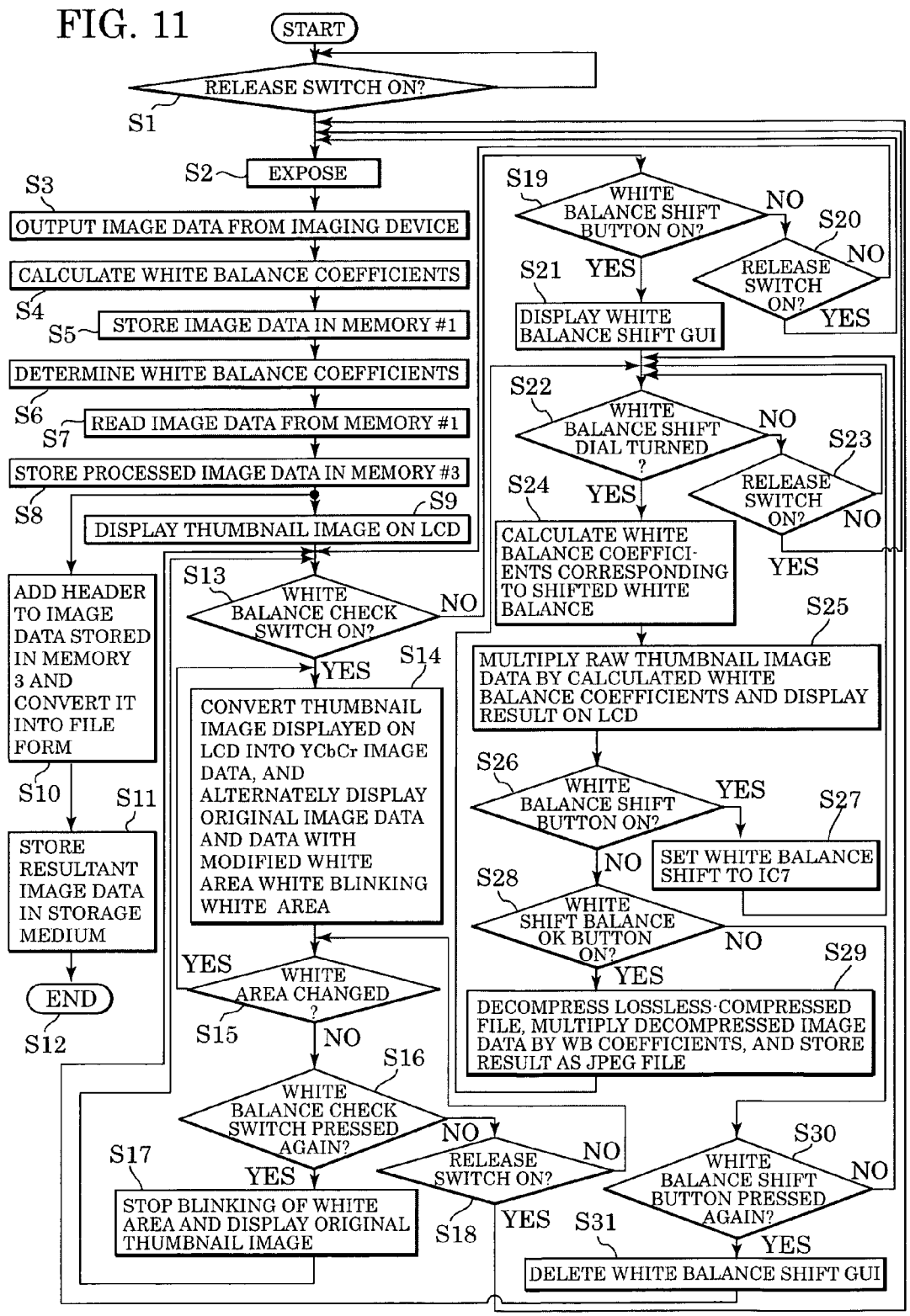
FIG. 11 is a flow chart showing image processing performed by a digital camera according to an embodiment of the present invention.

In a case where the present invention is applied to the aforesaid storage medium, the storage medium stores program codes corresponding to the flowchart of FIG. 11 described in the embodiments.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-414043 filed Dec. 12, 2003, which is hereby incorporated by reference herein.

What is claimed is:

1. An image capture apparatus comprising:
an image sensing device which converts an optical image into an electric signal;
an analog-to-digital converter which converts the electric signal output from the image sensing device into digital image data;
a storage unit which stores the image data, in a non-compressed form or a lossless-compressed form;
a first setting unit which sets a white balance parameter;
a white balance correction unit which implements white balance correction on the image data read from the storage unit in accordance with the white balance parameter set by the first setting unit;
a display which displays a setting screen providing a first adjustment mode in which color temperature is adjustable in a color temperature direction by a user and a second adjustment mode in which another parameter for white balance other than the color temperature is adjustable in a direction different from the color temperature direction with both an axis of the color temperature direction and an axis of the different direction being displayed on the setting screen; and
a second setting unit which sets a new white balance parameter for the white balance correction unit in accordance with the color temperature and the another parameter adjusted in at least one of the first adjustment mode and the second adjustment mode,
wherein a cross point of the axis of the color temperature direction and the axis of the different direction is positioned so as to be a point indicating a white color on a black body radiation locus according to the white balance parameter set by the first setting unit.

2. An image capture apparatus according to claim 1, wherein the setting screen displayed by the display includes a two-dimensional color space in one of forms of a CbCr plane of a YCbCr color space and an a*b* plane of an L*a*b* color space.

3. An image capture apparatus according to claim 1, wherein an original image and an image whose white balance is adjusted in accordance with the parameter set via the setting screen are alternately displayed.

4. An image capture apparatus according to claim 1, further comprising an area designation part disposed on the setting screen on which image data read from the storage unit is displayed, which designates an area on the setting screen, wherein an area in a two-dimensional color space corresponding to a color in the designated area is displayed in the two-dimensional color space.

5. An image capture apparatus according to claim 1, wherein the white balance correction unit makes the white balance correction such that a gain for a component of image data having a greatest contribution to luminance is fixed, and gains for the other components of the image data are varied.

6. An image capture apparatus according to claim 1, wherein:
the image data stored in the storage unit includes header information including information indicating a condition under which an image was taken by the image capture device, lossless-compressed image data, image data produced by reducing the size of the lossless-compressed image data, compressed image data produced by performing image processing on the lossless-compressed image data depending on the condition under which the image was taken by the image capture device, and thumbnail image data subjected to the image processing, for use to display on the setting screen are stored in the storage unit such that the header information and the image data are linked to one another; and
the white balance correction unit makes the white balance correction on the image data produced by reducing the size of the lossless-compressed image data.

7. A method of setting of a white balance correction on captured image data by an image capturing apparatus, which is a non-compressed form or a lossless-compressed form, comprising the steps of:
setting a white balance parameter for the white balance correction;
displaying a setting screen providing a first adjustment mode in which color temperature is adjustable in a color temperature direction and a second adjustment mode in which another parameter for white balance other than the color temperature is adjustable in a direction different from the color temperature direction with both an axis of the color temperature direction and an axis of the different direction being displayed on the setting screen;
setting a new white balance parameter for the white balance correction in accordance with the color temperature and the another parameter adjusted in at least one of the first adjustment mode and the second adjustment mode,
wherein a cross point of the axis of the color temperature direction and the axis of the different direction is positioned so as to be a point indicating a white color on a black body radiation locus according to the white balance parameter set.

8. A computer-readable storage medium on which a program for implementing the method according to claim 7 is stored.

9. An image processing system for processing image data taken by an image capture device including an image sensing device which converts an optical image into an electric signal, an analog-to-digital converter which converts the electric signal output from the image sensing device into digital image data, a storage unit which stores the image data, in a non-compressed form or a lossless-compressed form, into a storage medium, and a first setting unit which sets a white balance parameter, the image processing system comprising:
an input unit which inputs image data stored in the storage medium;
a display which displays a setting screen providing a first adjustment mode in which color temperature is adjustable in a color temperature direction and a second adjustment mode in which another parameter for white balance other than the color temperature is adjustable in a direction different from the color temperature direction with both an axis of the color temperature direction and an axis of the different direction being displayed on the setting screen;
a second setting unit which sets a new white balance parameter for white balance correction in accordance with the color temperature and the another parameter adjusted in at least one of the first adjustment mode and the second adjustment mode; and
a white balance correction unit which makes a white balance correction on the image data read from the storage unit in accordance with the new white balance parameter set via the second setting unit;
wherein a cross point of the axis of the color temperature direction and the axis of the different direction is positioned so as to be a point indicating a white color on a black body radiation locus according to the white balance parameter set by the first setting unit.

10. A method of processing image data taken by an image capture device including an image sensing device which converts an optical image into an electric signal, an analog-to-digital converter which converts the electric signal output from the image sensing device into digital image data, a storage unit which stores the image data, in a non-compressed form or a lossless-compressed form, into a storage medium, and a first setting unit which sets a white balance parameter, the method comprising the steps of:

inputting image data stored in the storage medium;

displaying a setting screen providing a first adjustment mode in which color temperature is adjustable in a color temperature direction and a second adjustment mode in which another parameter for white balance other than the color temperature is adjustable in a direction different from the color temperature direction, both an axis of the color temperature direction and an axis of the different direction are displayed on the setting screen;

setting a new white balance parameter for white balance correction in accordance with the color temperature and the another parameter adjusted in at least one of the first adjustment mode and the second adjustment mode; and making a white balance correction on the image data read from the storage unit in accordance with the new white balance parameter set in the setting step, wherein a cross point of the axis of the color temperature direction and the axis of the different direction is positioned so as to be a point indicating a white color on a black body radiation locus according to the white balance parameter set by the first setting unit.

11. A computer-readable storage medium on which a program for implementing the image processing method according to claim 10 is stored.

* * * * *